(12) United States Patent
Klingmann et al.

(10) Patent No.: US 9,581,063 B2
(45) Date of Patent: Feb. 28, 2017

(54) POLLUTANT ABATEMENT SYSTEM FOR GASOLINE VEHICLES

(71) Applicant: Umicore AG & CO. KG, Hanau-Wolfgang (DE)

(72) Inventors: Raoul Klingmann, Alzenau (DE); Stephanie Spiess, Frankfurt (DE); Ka-Fai Wong, Erlensee (DE); Joerg-Michael Richter, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 6 days.

(21) Appl. No.: 14/389,716

(22) PCT Filed: Apr. 10, 2013

(86) PCT No.: PCT/EP2013/057432
§ 371 (c)(1),
(2) Date: Sep. 30, 2014

(87) PCT Pub. No.: WO2013/153081
PCT Pub. Date: Oct. 17, 2013

(65) Prior Publication Data
US 2015/0107228 A1 Apr. 23, 2015

Related U.S. Application Data

(60) Provisional application No. 61/639,091, filed on Apr. 27, 2012.

(30) Foreign Application Priority Data

Apr. 13, 2012 (EP) .................................... 12164142

(51) Int. Cl.
*F01N 3/035* (2006.01)
*B01J 23/40* (2006.01)
(Continued)

(52) U.S. Cl.
CPC ............ *F01N 3/035* (2013.01); *B01D 53/945* (2013.01); *B01D 53/9454* (2013.01); *B01J 23/40* (2013.01);
(Continued)

(58) Field of Classification Search
CPC .......... F01N 3/035; F01N 3/206; F01N 3/101; F01N 3/0842; F01N 3/0814; F01N 13/009;
(Continued)

(56) References Cited

U.S. PATENT DOCUMENTS

| 4,329,162 A | 5/1982 | Pitcher, Jr. |
| 6,047,544 A * | 4/2000 | Yamamoto ........... B01D 53/945 422/171 |

(Continued)

FOREIGN PATENT DOCUMENTS

| EP | 1789191 | 5/2007 |
| EP | 1974809 | 10/2008 |

(Continued)

OTHER PUBLICATIONS

Written Opinion of the International Searching Authority for international application No. PCT/EP2013/057432 dated Oct. 13, 2014.
(Continued)

*Primary Examiner* — Patrick Maines
(74) *Attorney, Agent, or Firm* — Smith, Gambrell & Russell, LLP

(57) ABSTRACT

The present invention is directed to a pollutant abatement system for vehicles propelled by a gasoline combustion engine, in particular a gasoline direct injection engine (GDI). In addition, this invention is concerned with a process of mitigating noxious compounds in the exhaust of such an engine efficiently by applying the inventive abatement system to fulfill future legislative exhaust regulations.

19 Claims, 4 Drawing Sheets

Figure 1:
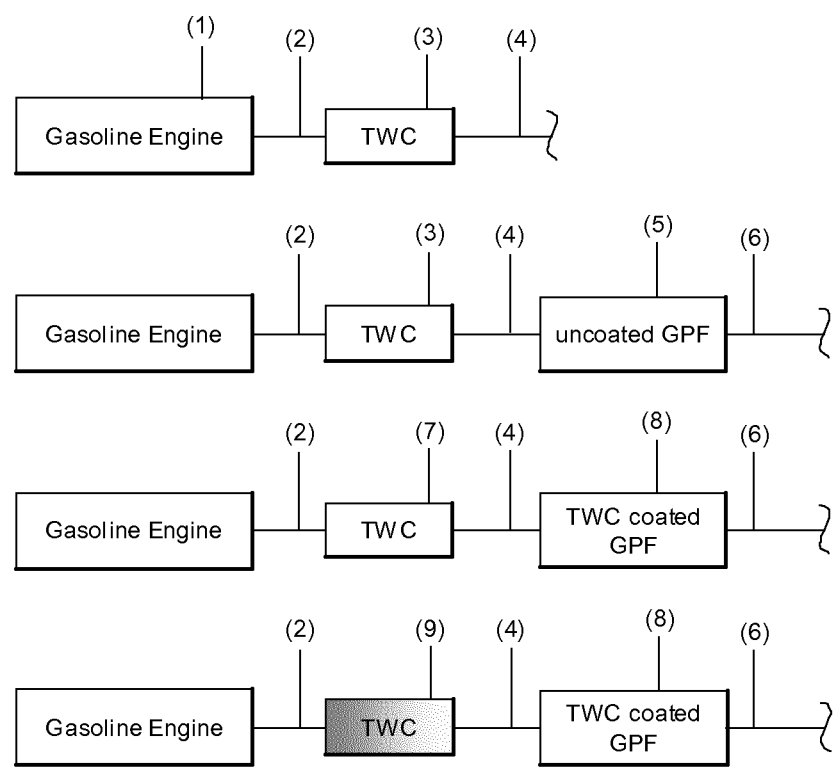

(51) Int. Cl.

| | | |
|---|---|---|
| *B01D 53/94* | (2006.01) | |
| *F01N 3/10* | (2006.01) | |
| *B01J 37/03* | (2006.01) | |
| *B01J 35/00* | (2006.01) | |
| *B01J 23/44* | (2006.01) | |
| *B01J 23/46* | (2006.01) | |
| *B01J 35/04* | (2006.01) | |
| *F01N 13/00* | (2010.01) | |
| *F01N 3/20* | (2006.01) | |
| *B01J 21/04* | (2006.01) | |

(52) U.S. Cl.
CPC ............ *B01J 23/44* (2013.01); *B01J 23/462* (2013.01); *B01J 35/0006* (2013.01); *B01J 35/04* (2013.01); *B01J 37/038* (2013.01); *F01N 3/101* (2013.01); *F01N 3/206* (2013.01); *F01N 13/009* (2014.06); *B01D 2255/102* (2013.01); *B01D 2255/1023* (2013.01); *B01D 2255/1025* (2013.01); *B01D 2255/904* (2013.01); *B01D 2255/9155* (2013.01); *B01D 2255/9205* (2013.01); *B01J 21/04* (2013.01); *F01N 2250/02* (2013.01); *F01N 2340/02* (2013.01); *F01N 2340/06* (2013.01); *F01N 2510/068* (2013.01); *Y02T 10/22* (2013.01)

(58) Field of Classification Search
CPC ............ F01N 13/02; B01D 2255/9155; B01D 2255/1021; B01D 53/945; Y02T 10/22; B01J 29/74; B01J 29/068; B01J 23/42; B01J 2523/828
USPC ............................ 60/274, 283, 299, 301, 297
See application file for complete search history.

(56) References Cited

U.S. PATENT DOCUMENTS

| | | | | |
|---|---|---|---|---|
| 6,303,084 B1* | 10/2001 | Ito | ...................... | B01D 53/9454 422/171 |
| 6,540,968 B1* | 4/2003 | Huang | .................. | B01D 53/945 423/213.5 |
| 8,066,963 B2 | 11/2011 | Klingmann et al. | | |
| 2004/0038814 A1* | 2/2004 | Suzuki | .................. | B01D 53/945 502/339 |
| 2004/0101453 A1* | 5/2004 | Fujiwara | .............. | B01D 53/944 422/177 |
| 2005/0084427 A1* | 4/2005 | Kikuchi | ................. | F01N 3/0814 422/180 |
| 2005/0170953 A1 | 8/2005 | Shirahata et al. | | |
| 2005/0188605 A1* | 9/2005 | Valentine | .................. | C10L 1/10 44/321 |
| 2008/0081761 A1* | 4/2008 | Suzuki | ................. | B01D 53/945 502/304 |
| 2009/0129995 A1 | 5/2009 | Pfeifer et al. | | |
| 2009/0193796 A1 | 8/2009 | Wei et al. | | |
| 2010/0239478 A1 | 9/2010 | Arnold et al. | | |
| 2010/0275579 A1 | 11/2010 | Klingmann et al. | | |
| 2010/0293929 A1* | 11/2010 | Zhan | ....................... | F01N 3/035 60/297 |
| 2011/0030346 A1* | 2/2011 | Neubauer | ........... | B01D 53/944 60/274 |
| 2011/0158871 A1* | 6/2011 | Arnold | ................... | B01J 23/464 423/212 |
| 2011/0252773 A1 | 10/2011 | Arnold et al. | | |
| 2014/0086803 A1* | 3/2014 | Cattani | .............. | B01D 53/9477 422/170 |

FOREIGN PATENT DOCUMENTS

| | | |
|---|---|---|
| EP | 1974810 | 10/2008 |
| WO | 2006021336 | 3/2006 |
| WO | 2012/069404 A1 | 5/2012 |
| WO | 2012/069405 A1 | 5/2012 |

OTHER PUBLICATIONS

International Search Report for International Application No. PCT/EP2013/057432 dated Oct. 17, 2013.
E. Ohara et al., "*Filtration Behavior of Diesel Particulate Filters (1)*", SAE Technical Paper Series, 2007-01-0921, 2007.
Braisher et al, "*Particle Number Emissions from a Range of European Vehicles*", SAE International, 2010-01-0786, Apr. 12, 2010.
C. Saito et al., "*New Particulate Filter Concept to Reduce Particle Number Emissions*", SAE International, 2011-01-0814, Apr. 12, 2011.
International Preliminary Report on Patentability for International Application No. PCT/EP2013/057432 dated Oct. 14, 2014 (4 pages).

\* cited by examiner (Reference, Ex. 1, Ex. 2, Ex. 3)

POLLUTANT ABATEMENT SYSTEM FOR GASOLINE VEHICLES

The present invention is directed to a pollutant abatement system for vehicles powered by a gasoline combustion engine, in particular a gasoline direct injection engine (GDI). In addition, this invention is concerned with a process of efficiently mitigating noxious compounds in the exhaust of such engines by applying the inventive abatement system to fulfill future legislative exhaust regulations.

Exhaust gases from internal combustion engines operated with a predominantly stoichiometric air/fuel mixture, like e.g. port-fuel injection (PFI) engines, are cleaned according to conventional methods with the aid of three-way catalytic converters. These are capable of converting the three essentially gaseous pollutants of the engine, specifically hydrocarbons, carbon monoxide, and nitrogen oxides, simultaneously to harmless components. Apart from the gaseous hydrocarbon (HC), carbon monoxide (CO) and nitrogen oxide (NOx) pollutants, the exhaust gas of gasoline engines also contains little ultrafine particulate matter (PM), which results from the incomplete combustion of the fuel and consists essentially of soot.

Certain gasoline direct injection (GDI) engine technologies were later introduced which involve conditions of more efficient combustion resulting in improved fuel consumption. Such conditions, however, can lead to the generation of even more particulates. In contrast to particulates generated by diesel lean burning engines, the particulates generated by gasoline direct injection engines tend to be much finer. This is due to the different combustion conditions of a diesel engine as compared to a gasoline engine. For example, gasoline engines run at a higher temperature than diesel engines. Also, hydrocarbon components are different in the emissions of gasoline engines as compared to diesel engines.

Vehicles with gasoline direct injected (GDI) engines with and without turbocharger are gaining market share in Europe due to their superior fuel economy and drivability when compared to vehicles with port-fuel injection (PFI) engines. This trend is expected to continue due to the mandate of the European Union to passenger car manufacturers to further decrease $CO_2$ emissions and meet a fleet average of 130 g/km $CO_2$ emissions in 2012. More ambitious $CO_2$ fleet average targets are still under discussion. With CAFE standards becoming more demanding it is generally anticipated that in North America the share of GDI vehicles will grow at the expense of PFI vehicles.

A concern related to GDI vehicles is the mentioned particle emission originating from this engine type, especially due to the relatively small particle sizes and therefore potentially more hazardous nature of these particles. Since the implementation of Euro 5b emission legislation stage in the beginning of 2011 all new registered Diesel passenger cars have to comply with a particulate mass limit of 4.5 mg/km as well as with a solid particle number limit of $6 \times 10^{11}$ #/km (table 1). The introduction of a particle number limit for gasoline vehicles was postponed to the Euro 6 emission legislation stage which will come into effect September 2014. It is anticipated that the limits for spark ignited vehicles will be the same as those for compression ignited vehicles to arrive at technology-neutral emission legislation.

TABLE 1

Euro 6 emission limits for passenger cars

| | | compression ignition vehicles | spark ignition vehicles |
|---|---|---|---|
| THC | mg/km | n.a. | 100 |
| NMHC | mg/km | n.a. | 68 |
| HC + NOx | mg/km | 170 | n.a. |
| NOx | mg/km | 80 | 60 |
| CO | mg/km | 500 | 1000 |
| particle mass | mg/km | 4.5 | 4.5 |
| particle number | #/km | $6.0 \times 10^{11}$ | TBD |

Gasoline vehicles with port-fuel injection usually comply with the proposed particle emission target of 600 billion particles per kilometer. A study by Braisher et al. revealed that particle number emissions by direct injection vehicles were over a magnitude higher than with port-fuel injection vehicles with a large portion of the particles being emitted during the cold start of the driving cycle (Braisher, M., Stone, R., Price, P., "Particle Number Emissions from a Range of European Vehicles," SAE Technical Paper 2010-01-0786, 2010, doi:10.4271/2010-01-0786). Particulate mass emissions exhibited the same trend.

Several studies have shown that only wall-flow filters are effective in reducing the particle number emissions of these engines below the target of $6 \times 10^{11}$ #/km. Cordierite-type wall-flow filters have become a standard solution for heavy duty diesel vehicles and have also gained a lot of consideration for passenger car diesel applications. Recent studies have shown the successful application of cordierite filters for the particle exhaust treatment of GDI vehicles (Saito, C., Nakatani, T., Miyairi, Y., Yuuki, K., Makino, M., Kurachi, H., Heuss, W., Kuki, T., Furuta, Y., Kattouah, P., and Vogt, C.-D., "New Particulate Filter Concept to Reduce Particle Number Emissions," SAE Technical Paper 2011-01-0814, 2011, doi:10.4271/2011-01-0814).

Besides regulations for the treatment of exhaust gas particles, emission standards for unburned hydrocarbons, carbon monoxide, and nitrogen oxide contaminants also continue to become more stringent (table 1). In order to meet such standards, catalytic converters containing dedicated three-way catalyst (TWC) need to be installed in the exhaust gas line of gasoline combustion engines. As mentioned earlier, said catalyst promotes the oxidation of unburned hydrocarbons and carbon monoxide by oxygen as well as the reduction of nitrogen oxides to nitrogen in the exhaust gas stream. Moreover, especially designed filter types have now been proposed for the application in gasoline direct injection engines dealing with all kinds of emitted pollutants. As the particulate size of emitted soot is smaller compared to Diesel engines it is to further investigate how to balance the filtering effect in view of the apparent backpressure penalty appropriately (US20100239478, US20100275579, U.S. Pat. No. 8,066,963, US20110030346, US20090193796, SAE2011010814).

Catalytic systems have already been proposed which try to efficiently cope with all of the pollutants emitted by GDI engines. In some cases these systems are designed in a layout in which a close-coupled TWC is followed by a wall-flow filter (catalyzed gasoline particulate filter; GPF). In some instances, also the wall-flow filter carries a catalytic functionality, e.g. a further TWC.

E.g. the US20100293929 deals with exhaust gas emission aftertreatment systems for spark ignition engines. Various embodiments of the system mentioned here comprise both a close coupled TWC device, and an underfloor treatment device. The underfloor treatment device may either have TWC or NOx reduction functionality. According to the disclosed FIG. 1 the system can embrace a wall-flow TWC coated filter element (8). It is mentioned that with regard to the FIG. 4 the TWC catalyst formulation on the filter is operable to reduce particulate matter, as well as the gases treated by conventional TWC devices. So the wall-flow filter is able to reduce HC, CO, NOx when its light off temperature is reached, and effectively reduce particulate matter emissions under all operating conditions. However, no more details with regard to the content of the close-coupled TWC and the TWC coated filter are given in this disclosure.

Likewise US20110252773 discloses an exhaust system suitable for use in conjunction with gasoline engines to capture particulates in addition to reducing gaseous emissions such as hydrocarbons, nitrogen oxides, and carbon monoxide. The TWC coated particulate filter has washcoat loadings in the range of at least 1 to 4 g/in$^3$ to minimize backpressure penalties. The porosity of the coated filter may be in the range of 55 to 70% and may comprise certain mean pore size distributions. The catalyzed filter may need to be used in conjunction with a second TWC in order to meet regulations and car manufacturer requirements (FIG. 1). However, the upstream TWC may be smaller than otherwise needed because of the downstream TWC coated particulate filter or may even be omitted if the filter provides full TWC functionality. The catalyzed particulate filter may comprise a zoned layout, in which the upstream zone comprises the palladium component in an amount that is greater than the amount of the palladium component in the downstream zone. It is said that the catalyzed filter should contain between 2-100 g/ft$^3$ palladium in the upstream zone and 1-20 g/ft$^3$ palladium in the downstream zone. The systems tested in this application comprise precious metal loadings in the TWC and the catalyzed filter of ≥30 g/ft$^3$. The palladium to rhodium ratios are in each case 27/3 for both catalytic devices.

Equally, the US20110158871 concerns an exhaust system for a vehicular positive ignition internal combustion engine. The system comprises a three-way catalyst washcoat disposed on a substrate monolith located upstream of the filter, which is also coated with a TWC washcoat. It is claimed that the upstream device comprises equally or less than 75% of the total mass of the three-way catalyst washcoat in the exhaust system. The behaviour of the wall-flow filter was examined in view of the mean pore size of the filter substrate and its washcoat loading. In view of the disclosed patent application the close-coupled TWC comprises a TWC-washcoat like the downstream TWC coated ceramic wall-flow filter. In the examples the wall-flow filter substrate comprises e.g. a Pd—Rh-ratio of 16:1 at a loading of 85 g/ft$^3$. The close-coupled TWC was coated with an identical loading.

It was an objective of the present invention to provide a system for the abatement of pollutants emitted by a gasoline direct injection engine, which shows superior effects over the systems disclosed in the prior art both from an economical as well as from an ecological point of view. In particular, the system of the invention should serve to securely meet the future legislation standards discussed. In addition, this goal is to be reached advantageously with less precious metal costs than associated with the systems present in the prior art. Likewise a process for the efficient treatment of gasoline direct injection engine exhaust should be provided.

These and other objectives, being obvious to the ones skilled in the art, are met by a system as described in claim 1. Preferred embodiments of the system of the invention are protected in subclaims 2-10 relating to claim 1. Claim 11 is directed to an inventive process.

In a first aspect the present invention concerns a gasoline engine exhaust treatment system comprising a close-coupled three-way catalyst (TWC) and a downstream catalyzed gasoline wall-flow particulate filter (GPF). This system is characterized by a certain ratio of precious metal content of the close-coupled TWC compared to the downstream catalyzed gasoline particulate filter. In particular, the amount of platinum group metals, e.g. Pd and Rh, in the TWC exceeds the amount of platinum group metals, e.g. Pd and Rh, in the GPF by a factor of at least 5. This system is able to dispense with the objectives mentioned above in a relatively easy but nonetheless surprising fashion. It could be shown that by distributing the precious metal content of the system in a manner according to the present invention, same results could be achieved with fewer amounts of precious metals which in turn lead to a cheaper production of the system of the invention or at same costs serves for better mitigation of noxious pollutants.

Both the upstream TWC and the downstream GPF advantageously comprise the precious metals palladium, rhodium, platinum or mixtures thereof. Other precious metals, e.g. iridium, rhenium, ruthenium, silver, gold may also be present. However, if present the latter PGMs are contained in less amounts compared to palladium and rhodium, respectively. It is most preferred that the platinum group metals present in the upstream TWC and the downstream GPF are palladium and rhodium only.

In a further preferred embodiment of the present invention the ratio of platinum group metals in the upstream TWC and the downstream GPF is at least 6, more preferred at least 7, still further preferred at least 8 or 9, and ultimately preferred at least 10. This is in particular preferred if the platinum group metals involved in the system are Pd and Rh only.

It has been found that the platinum group metal content of the downstream gasoline particulate filter helps to accelerate the combustion of the soot accumulated in the filter. Hence, an upper limit of the ratio of TWC vs. GPF in platinum group metals is drawn by the fact that the GPF should still comprise a beneficial TWC functionality which is sufficient to supplement the functionality of the upstream TWC in an economic and ecologic manner, and still should show the ability to accelerate burning off soot particles. It is obvious that in this connection also the amount of platinum group metals in the upstream TWC should be balanced by cost factors and the efficiency in mitigating noxious exhaust pollutants via the inventive system. It has to be noticed that this factor may heavily depend on the kind of engine involved and the composition of its exhaust gas, as well as the extent in which the PGMs are effective on the devices in question (e.g. decrease of activity through aging, support used etc.). The skilled worker will know how to find the upper limit for the platinum group metal ratio according to the above mentioned parameters. However, this upper limit varies advantageously between 10-23 with preference between 15-20, and most preferably between 16-19. Taken this the amounts of platinum group metals, e.g. Pd and Rh, on the upstream TWC varies advantageously between 20-200 g/ft$^3$, more preferably between 25-120 g/ft$^3$, and most preferably around 30-80 g/ft$^3$. The downstream GPF contrarily shows platinum group metal contents of preferably 2-20 g/ft$^3$, more preferably 2-15 g/ft$^3$, and most preferably around 2-10 g/ft$^3$.

In an advantageous alternative embodiment the platinum group metals in the upstream TWC are present in certain ratio to each other. E.g. in case of palladium and rhodium being the only platinum group metals in question the upstream TWC has a weight ratio of Pd to Rh which varies between 8-40:1, preferably between 10-25:1, and most preferably around 11-19:1. The downstream GPF carrying less high a concentration of platinum group metals likewise comprises certain ratios of these platinum group metals. Again e.g. in case of palladium and rhodium being the only platinum group metals in question the downstream GPF shows a weight ratio of Pd to Rh between 1-10:1, preferably between 1-5:1, and most preferably around 1-3:1.

The present invention provides for an exhaust treatment system for gasoline direct injection engines. The system comprises a TWC device followed by a GPF which is also coated with a catalyst comprising TWC functionality. The TWC is—according to the invention—positioned in an upstream part of the exhaust system. In a preferred embodiment of the present invention the TWC device is located in a so-called close-coupled position. This means that the close coupled emission treatment device is positioned near the exhaust output of the exhaust manifold, the engine exhaust output itself or the turbo charger. That is to say that the TWC is preferably located ca. 2-40 cm downstream of the engine, more preferably ca. 5-30 cm and most preferably 5-20 cm away from the respective exhaust output/turbo charger.

Normally, vehicles have an engine compartment containing the engine and related subsystems and devices, including the close-coupled emission treatment device mentioned above. The firewall at the floor of the vehicle separates the engine compartment and driver/passenger compartment from the subfloor subsystems and devices. The latter is nominating an underfloor or underbody position of a device if the device is positioned under said vehicle's floor. In a preferred aspect of the present invention the downstream GPF is located in such an underfloor position. The downstream GPF of the invention is, therefore, in fluid communication with the upstream TWC being associated with the engine, turbo charger or manifold output, so that the exhaust gases produced by the direct injection engine are first conveyed through the TWC device, preferably located in a close-coupled position, and then carried through an exhaust pipe to the downstream GPF, preferably positioned in an underfloor location. For the reasons of fluid dynamics of exhaust gas flow or diffusion it has turned out that an optimal distance exists between the TWC and the GPF. This distance depends strongly on several aspects, e.g. the engine involved and the system parameters, like activity of TWC vs. GPF. Hence, it is contemplated as being an underfloor position if the GPF is approximately 60-200 cm downstream of the engine output or exhaust manifold outlet. In a more preferred embodiment the GPF is located 60-150 cm downstream of said output. Most preferably the distance between said output and the GPF inlet is 60-120 cm.

All, some, or only one of the platinum group metals which are applied to the upstream TWC and/or the downstream GPF can be equally distributed over the respective device, can be present thereon in a zoned layout, or may be arranged in a layered manner.

In a very preferred embodiment the upstream TWC shows a zoned layout with regard to all, some, or only one of the platinum group metals located on it. In particular, e.g. in case palladium and rhodium being present as platinum group metals only, the palladium content can be distributed over the upstream TWC in a non-uniform manner, while advantageously the rhodium content is equally distributed over the entire device. That is to say that only the upstream TWC has a Pd-zoning. More preferably, the palladium content in an inlet zone of the upstream TWC is higher than the palladium content in an outlet zone of the upstream TWC. The weight ratio of this palladium content should lie within the limits of 2-10:1, preferably 3-7:1 and most preferably around 4-5:1. The inlet zone is located from the entrance of the device to less then the total length of it to the outlet. The outlet zone is located from the outlet of the device to less then the total length of it to the inlet. Both zones may overlap each other or may be arranged with or without a gap between them. In a preferred manner the inlet zone has a relative length compared to the substrate of ⅕-½, more preferably ⅕-⅓ and most preferably ⅕-¼. The outlet zone has preferably the same length like the inlet zone. In a most preferred embodiment both zones have a length of 7-8 cm and provide for a difference in Pd-loading of 4-5:1 between the respective zones.

As the size of particulate matter produced by a gasoline direct injection engine is rather small the pores and the porosity of the catalyzed gasoline particulate filter becomes important in that an advantageous balance has to be found between filtering efficiency and backpressure penalty. In addition, the TWC functionality being present on the filter may give rise to even more backpressure if applied to the filter with a disadvantageous washcoat. It has been found that the backpressure problem can be overcome by choosing specifically optimized washcoat having three-way functionality on GPFs comprising adapted porosities and mean pore sizes. By not wishing to be bound by theory it is believed that although the particle sizes of the particulate matter in the gasoline exhaust are smaller compared to diesel engine exhaust (see discussion above), the mean pore size of the walls of the GPFs according to this invention may show a rather large mean pore size of >14 or even >20 µm (SAE2007010921). At least the adopted pore sizes seem to be in conflict with recommendations given in the literature (SAE2011010814). Due to the fact that washcoats having appropriately sized particles more or less intrude into the pores of the GPF-walls they help to catch soot but prevent building up backpressure. In a more preferred aspect the mean pore size of the GPF is between 14-25, more preferably between 15-21. The amount of washcoat present on or in the GPF can be properly determined according to the teaching of US20110252773 with respect to above mentioned topics.

Hence, at least to a certain extent the washcoat is not covering the walls of the GPF according to the invention but is located in the pores themselves. To be able to enter the porous structure of the GPF-walls the washcoat particles have to be smaller than the mean pore size of the filter. It is, therefore, advantageous if the particle size of particles in the washcoat is less than the mean pore size of the GPF involved. Preferably, the particle size of the washcoat is therefore between 0.1-20 µm, more preferably between 0.1-15 µm and most preferably between 0.1-10 µm.

It is submitted that the particle sizes given here show a certain variation in diameter values. It is to be understood by those skilled in the art that at least 80%, preferably at least 90% and most preferably at least 95% of the particles present in the washcoat have a diameter in the ranges mentioned above.

In a further aspect of the present invention the gasoline wall-flow particulate filter involved has a certain porosity. Not only mean pore sizes of the instant GPF are crucial for balancing the backpressure penalty. Also the amount of pores determines the backpressure of a wall-flow filter. Advantageously, the gasoline wall-flow particulate filter according to the present invention has a porous wall structure comprising porosities between 45%75%, preferably the porous structure has a porosity between 55%-70%, and most preferably between 60%-65%.

A very preferred aspect of the present invention is directed to a gasoline direct injection engine exhaust treatment system comprising a close-coupled three-way catalyst (TWC), e.g. with Pd-zoning, and a downstream TWC-catalyzed gasoline particulate filter (GPF), wherein the mean pore size of the wall-flow particulate filter is around 18-22 µm, the size of particles in the washcoat applied to the filter is between 1-7 µm, and the porosity of the filter lies around 60-70%.

In another embodiment of the present invention, the present invention is directed to a process for the abatement of noxious pollutants emitted by gasoline engines, wherein the exhaust gas is contacted with a system according to the invention. It is to be understood by those skilled in the art that all the preferred and advantageously mentioned aspects and embodiments of the inventive system also readily apply mutatis mutandis to the present process.

TWC Substrate:

The TWC catalyst composites are disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending there through from an inlet or an outlet face of the substrate, such that passages are open to fluid flow there through (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60-900 or more gas inlet openings (i.e., cells) per square inch of cross section.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. The substrates useful for the catalyst composite of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium, and/or aluminum, and the total amount of these metals may advantageously comprise at least about 15 wt % of the alloy, e.g., about 10-25 wt % of chromium, about 3-8 wt % of aluminum and up to about 20 wt % of nickel. The alloys may also contain small or trace amounts of one or more other metals such as manganese, copper, vanadium, titanium and the like. The surface of the metal substrates may be oxidized at high temperatures, e.g., about 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate. In alternative embodiments, one or more catalyst compositions may be deposited on an open cell foam substrate. Such substrates are well known in the art, and are typically formed of refractory ceramic or metallic materials.

GPF Substrate:

According to the present invention, a treatment system is provided comprising a wall-flow particulate filter which is specially adapted to the treatment of gasoline engine exhaust gas streams, in particular those originating from direct injection gasoline engines. Advantageously, any wall-flow filter substrate may be used in the present invention, provided that it allows the effective filtering of particulate matter contained in gasoline engine exhaust gas streams. Preferably, a so called gasoline particulate filter (GPF) is used as the filter substrate, wherein, according to the present invention, reference to a particulate trap means a filter so sized and configured to trap particulates generated by the combustion reactions in the gasoline engine, preferably in gasoline engines with direct injection technologies.

Hence, preferably the GPF-substrate is a wall-flow monolith or wall-flow filter, and more preferably a wall-flow filter having a honeycomb structure. Useful wall-flow substrates include those having a plurality of fine, substantially parallel gas flow passages extending along the longitudinal axis of the substrate. Preferably, each passage is blocked at one end of the substrate body, with alternate passages blocked at opposite end-faces. U.S. Pat. No. 4,329,162 is incorporated herein by reference with respect to the disclosure of suitable wall-flow substrates which may be used according to the present invention.

The particulate filter substrate may be conceived of any material or combination of materials allowing for the filtering of particulate matter contained in gasoline engine exhaust gas without impeding the function of a gasoline engine in fluid communication with the particulate filter. For this purpose, porous materials are preferably used as the substrate material, in particular ceramic-like materials such as cordierite, alpha-alumina, silicon carbide, aluminum titanate, silicon nitride, zirconia, mullite, spodumene, alumina-silica-magnesia and zirconium silicate, as well as porous refractory metals and oxides thereof. According to the present invention, "refractory metal" refers to one or more metals selected from the group consisting of Ti, Zr, Hf, V, Nb, Ta, Cr, Mo, W, and Re. The particulate filter substrate may also be formed of ceramic fiber composite materials. According to the present invention, the particulate filter substrate is preferably formed from cordierite, silicon carbide, and/or from aluminum titanate. In general, materials are preferred which are able to withstand the high temperatures to which a particulate filter is exposed to when used in the treatment of gasoline engine exhaust gas.

More specifically, the particulate filter comprises preferably a particulate filter substrate, a first layer disposed on or in the one surface of the filter substrate which, and optionally a second layer disposed on or in the one surface of the filter substrate. In a very preferred embodiment of the invention, the coating is arranged entirely or at least predominately within the porous walls of the wall flow filter substrate.

TWC-Washcoat

According to the present invention the gasoline wall-flow particulate filter and the upstream TWC are coated with an appropriate washcoat carrying a catalyst comprising three-way functionality. The washcoat of both devices may be the same or different ones. In principle, within the limits of the present invention any TWC washcoat may be employed in the treatment system, provided that effective treatment of gasoline engine exhaust gas may be realized. Appropriate TWC washcoats in single layer or multilayer design can be found e.g. in EP1974810B1, PCT/EP2011/070541, EP1974809B1, or PCT/EP2011/070539. For further information see also the literature cited as background art. TWC catalysts are employed which comprise platinum group metals, e.g. Rh and Pd, more preferably they comprise Pd and Rh only.

In preferred embodiments of the present invention, the TWC washcoat comprises a catalyst composed out of a metal oxide support material, said support material preferably being selected from the group consisting of alumina, zirconia, zirconia-alumina, barium oxide-alumina, lanthana-alumina, lanthana-zirconia-alumina, and mixtures thereof. In particularly preferred embodiments, the metal oxide support material is gamma-alumina. Preferably, the support material is doped with a rare-earth, alkaline earth or refractory metal oxide in an amount preferably ranging from 0.01 to 30 wt.-%, more preferably from 0.05 to 15 wt.-%, even more preferably from 0.1 to 10 wt.-%. In particular, the rare-earth, alkaline earth or refractory metal oxide is preferably selected from the group consisting of ceria, lanthana, praseodymia, neodymia, barium oxide, strontium oxide, zirconia and mixtures thereof, wherein the rare-earth, alkaline earth or refractory metal oxide is preferably lanthana, barium oxide and/or zirconia According to a particularly preferred embodiment of the present invention, the metal oxide support material is gamma-alumina which is preferably doped with a rare-earth, alkaline earth or refractory metal oxide, more preferably with lanthana, barium oxide and/or zirconia. In addition to said support material, the TWC catalyst according to the present invention preferably comprises an oxygen storage component (OSC), said OSC preferably being selected from the group consisting of ceria, praseodymia and mixtures thereof and mixtures of those materials with other metal oxides, more preferably from the group consisting of ceria-zirconia-, ceria-zirconia-lanthana-, ceria-zirconia-neodymia-, ceria-zirconia-praseodymia, ceria-zirconia-yttria-, ceria-zirconia-lanthana-neodymia-, ceria-zirconia-lanthana-praseodymia- or ceria-zirconia-lanthana-yttria-mixtures.

The catalyst composite can be readily washcoated on a carrier. For a first layer of a specific washcoat, finely divided particles of a high surface area metal oxide such as gamma alumina are slurried in an appropriate vehicle, e.g., water. To incorporate components such as platinum group metals (e.g., palladium, rhodium, platinum, and/or combinations of the same), stabilizers and/or promoters, such components may be incorporated in the slurry as a mixture of water soluble or water-dispersible compounds or complexes. Typically, when PGM components, e.g. Pd and/or Rh, are included in the washcoat, the component in question is utilized in the form of a compound or complex to achieve dispersion of the component on the metal oxide support, e.g. activated alumina, like gamma alumina. In respect of the TWC washcoat, the term "component" means any compound, complex, or the like which, upon calcination or use thereof, decomposes or otherwise converts to a catalytically active form, usually the metal or the metal oxide. This applies accordingly to all platinum group elements used alone or in combination with one another according to the present invention. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate.

In general, any conceivable method may be employed for the production of the treatment system according to the present invention (for GPF: US2009129995, EP1789191, WO2006021336). By using those known techniques, the catalyst slurry may permeate the walls of the substrate. As used herein, the term "permeate" when used to describe the dispersion of the catalyst slurry on the substrate, means that the catalyst composition is dispersed throughout the wall of the substrate.

The coated substrates are dried typically at about 100° C., and calcined at a higher temperature (e.g., 300 to 450° C. and up to 550° C.). After calcining, the catalyst loading can be determined through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

The catalyst composites of the present invention may be formed in a single layer or multiple layers or zones. In some instances, it may be suitable to prepare one slurry of catalytic material and use this slurry to form multiple layers on the carrier. The composites can be readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated.

It is expressly mentioned that more catalysts or functionalities can be associated with the present system, like e.g. SCR functionality and/or OSC functionality and/or NSC functionality etc. (US20110158871; US20090193796).

The implementation of catalyzed Gasoline Particulate Filters (GPF) into the exhaust aftertreatment system can be a cost-efficient and sustainable solution to reduce the particle emissions of direct injection gasoline engines. The most challenging task is to provide sufficient particle number reduction at acceptable pressure drop in order not to compromise the $CO_2$ advantage of GDI engines while providing high conversion efficiencies for regulated pollutants at the same time. By applying a dedicated three-way functional washcoat onto a ceramic wall-flow filter and an upstream TWC all the aforementioned requirements could be satisfied to fulfill at least the upcoming Euro 6 legislation.

The beneficial impact of the catalytic coating on particle filtration efficiency as well as for the conversion efficiency of the catalyzed GPF for hydrocarbons, carbon monoxide and nitrous oxides could be proven. The replacement of a three-way catalyst in underfloor position of a two converter exhaust system by a catalyzed GPF could be realized without any impact on conversion efficiency for all regulated pollutants. Data obtained with exhaust systems comprising conventional three-way catalysts and add-on gasoline particulate filters on modern GDI applications even illustrate that along with newly gained filtration performance the emission abatement performance for all regulated pollutants can be improved. In particular, tailpipe NOx emissions could be decreased substantially with an additional catalyzed GPF.

FIGURES

Figure 2:
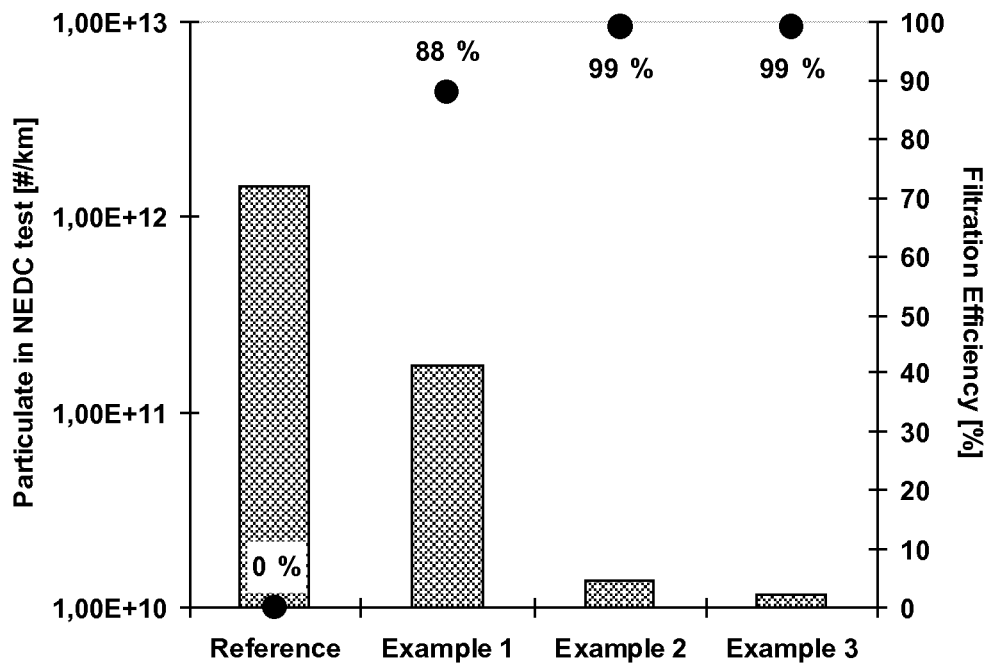
Figure 3:
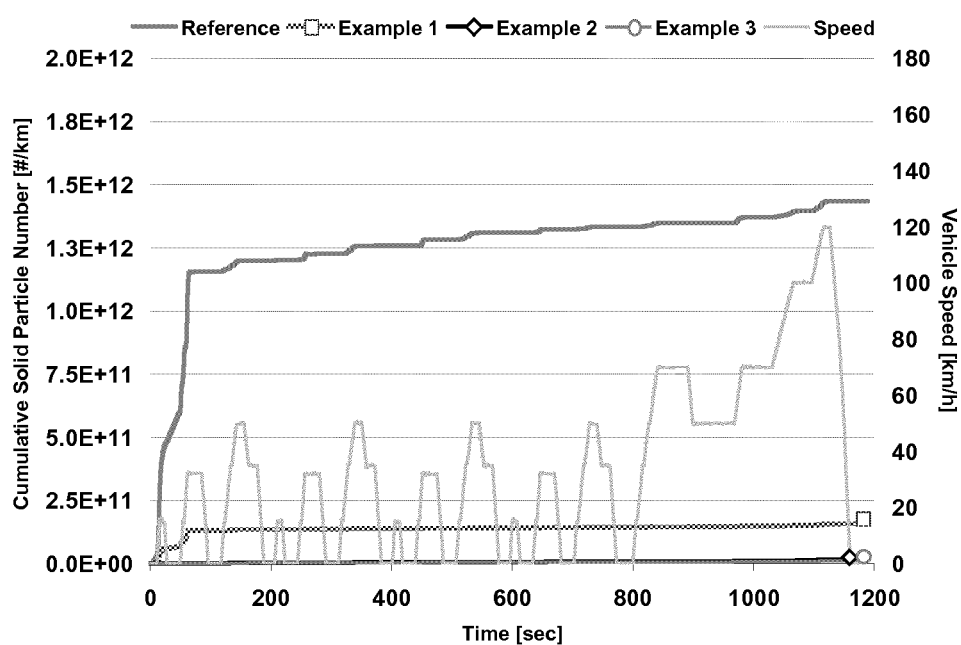
Figure 4:
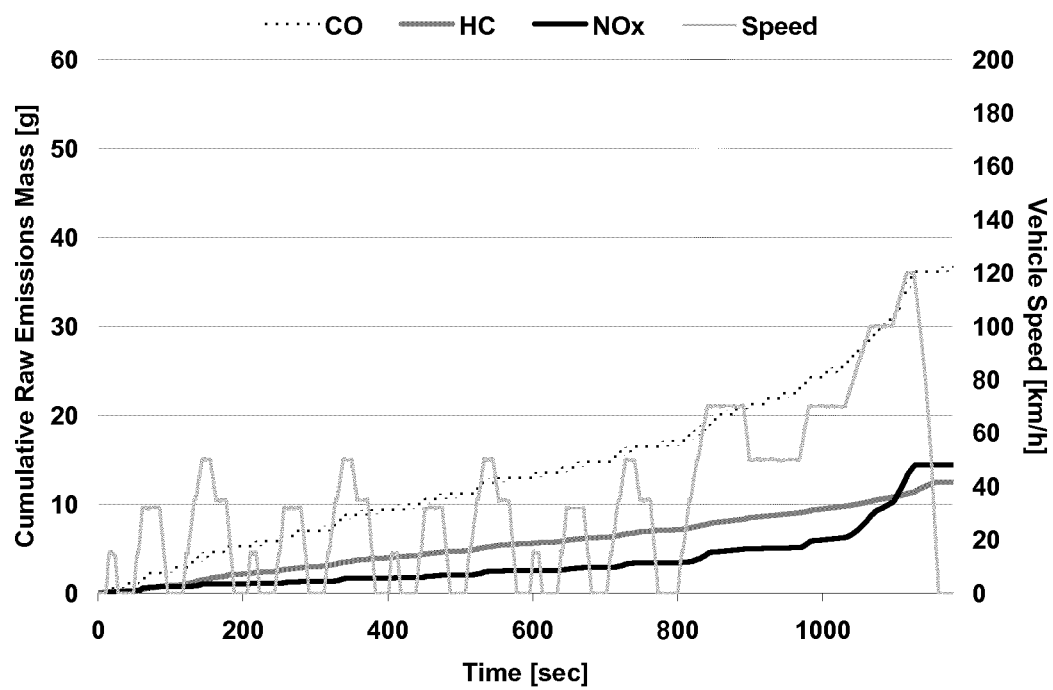
Figure 5:
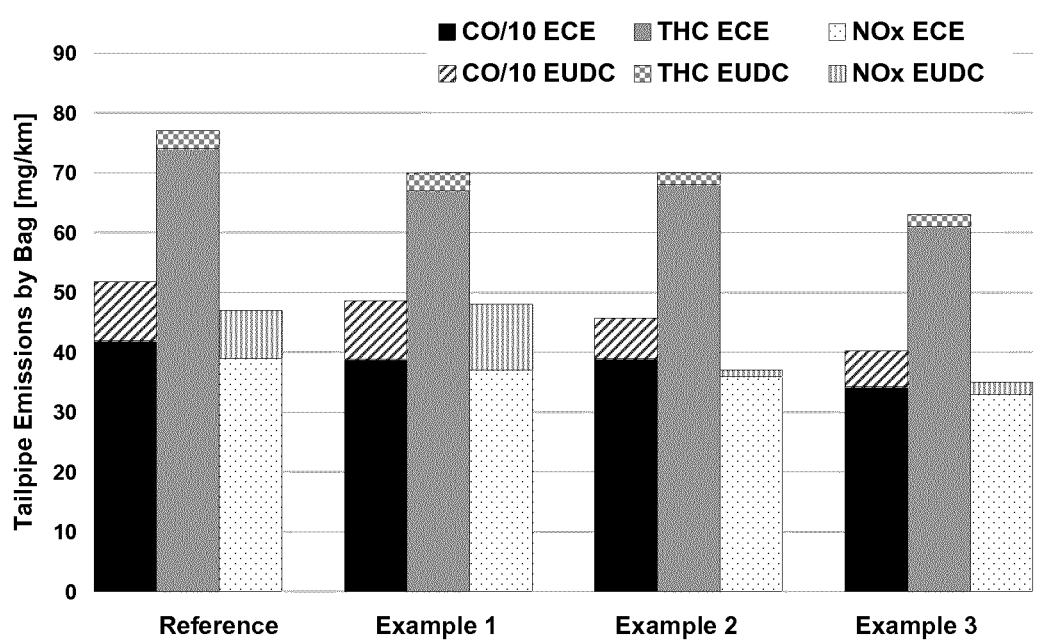

FIG. 1—Experimental setup and diagram of instrumentation locations.
FIG. 2—NEDC particle number emissions and filtration efficiency.
FIG. 3—1.4 L GDTI NEDC solid particle number emissions profile.
FIG. 4—1.4 L GDTI NEDC exhaust raw emissions.
FIG. 5—1.4 L GDTI Bag emission comparison between reference and systems for NEDC phases.

NUMBERING IN FIG. 1

1: gasoline engine
2: emission analyzer
3: reference TWC
4: emission analyzer
5: uncatalyzed GPF
6: emission analyzer
7: TWC
8: catalyzed GPF
9: zoned TWC

EXAMPLES

Experimental Setup

Emission analyzers (AVL/Pierburg AMA4000) were used to measure the gaseous emission CO, $CO_2$, NOx, THC and $O_2$. Exhaust gas sensors are located 2" before (2) and after (4) the TWC and after the GPF (6). Thermocouples and pressure sensor were located in similar positions for temperature and back pressure measurement. Additional lambda sensors were used to measure air-fuel ratio. A Horiba MEXA1000 was used to measure particulate number according to PMP. As particulate number PN was measured undiluted after the GPF the additional dilution step from MEXA1000 was used. The instrument was able to provide time-resolved particle number data.

Four systems were built (FIG. 1) and evaluated on a 1.4 L DI engine The Reference system used a 101.6 mm diameter substrate by 152 mm in length (3). The cell density is 600 cpsi. Examples 1 and 2 used the same Reference TWC catalyst technology but with a slightly different PGM loading ((3) and (9)) with an uncatalyzed (5) and catalyzed (8) GPF device, respectively, in the underfloor location. Example 3 used a PGM zoned TWC catalyst (9) with a catalyzed GPF (8). All GPF substrates are made of cordierite material with a 65% porosity and a large mean pore size of about 20 μm. Substrate dimensions are 118.4 mm in diameter by 152 mm in length. Cell density and wall thickness are 300 cpsi with 12 mil wall thickness. The filter substrates were coated with washcoat slurry having a three-way functional composition specifically optimized for usage in GPFs. The precious metal loadings of both close-coupled TWC and underbody GPF can be found in Table 2. All systems with catalyzed GPF that were evaluated in this study have lower precious metal costs than the Reference system. All systems were aged in parallel after a fuel-cut aging procedure with a bed temperature of 1030° C. inside the close coupled TWC catalyst.

TABLE 2

Precious metal loadings and costs of systems shown in FIG. 1.

| | Pd/Rh g/ft³ | | PGM cost $ | |
|---|---|---|---|---|
| | TWC | GPF | TWC | GPF |
| Reference | 56/4 | | 69.16 | |
| Example 1 | 56/4 | 0 | 69.16 | |
| Example 2 | 52/3 | 2/1 | 62.37 | 6.38 |
| Example 3 | 46ª/4 | 2/1 | 58.66 | 6.38 |

ªPd zoning: 3" inlet 76 g/ft³; 3" outlet 16 g/ft³

Test Results on a 1.4 L GDI Vehicle

For the application study of catalyzed GPFs a 1.4 L GDI vehicle was chosen: It was a 2005 MY 1.4 L direct injection engine with turbo charger. The engine is calibrated for Euro 4 emissions and used a production 1.25 l close-coupled catalyst. This engine was installed on a high dynamic engine bench equipped with a CVS system for bag analysis, three online analyzer lines (raw gas, after TWC and after GPF) for gaseous emission components and a particulate counter (Horiba MEXA 1000) that was used in undiluted exhaust after the GPF. To measure according to PMP it uses also the additional dilution step. All results shown from the high dynamic engine bench are average values of at least five tests.

Particle Emission Test Results

The particle number emissions measured in the European Driving Cycle of the four exhaust systems described in FIG. 1 are shown in FIG. 2. The particulate number emissions profile of the TWC only reference system is identical to the raw emissions of the vehicle. There is no measurable particle number abatement from the three-way catalyst on a flow-through substrate. Examples 1 to 3 equipped with Gasoline Particulate Filters reduce the amount of emitted particles drastically. FIG. 2 summarizes the particle emissions and the filtration efficiency. The particulate emission profile over the NEDC for all systems is shown in FIG. 3. The filtration efficiency of each aftertreatment system was calculated proportional to the measurements at the engine-out. Each value represents the average from five NEDC tests. With the chosen cordierite type filter the filtration efficiency of Example 1 is 88% resulting in emission of $1.7 \times 10^{11}$ #/km. By applying a washcoat to the filter the filtration efficiency increased to 99% and 99% for Example 2 and Example 3 resulting in $1.4 \times 10^{10}$ #/km and $1.2 \times 10^{10}$ #/km respectively. Both systems safely meet the proposed limits.

Conversion Efficiency of CO, HC and $NO_x$

Obtained raw emissions for all regulated pollutants measured in the European Driving Cycle are shown in FIG. 4. All modal emission data between 0 sec and 1200 sec were collected at engine-out location using AVL/Pierburg AMA4000 gas analyzers. While the cumulative mass of CO and HC emissions increases nearly linear over the cycle, there is a significant increase for NOx emissions mass during the last acceleration phase at high speed.

The CO, HC and NOx bag emissions from the investigated aftertreatment systems are summarized in FIG. 5. All values are averaged from at least five test results. Due to the addition of the underfloor canning comprising a filter this application changes combustion behavior and lambda control slightly in comparison to the single converter setup. Thereby, the HC tailpipe emissions (and also CO and NOx in ECE) are different for Reference and Example 1, respectively, both having the same close coupled TWC, although these systems show the same HC conversion efficiency. In contrast, a clear advantage in HC conversion could be observed by using the zoned TWC in Example 3. It is of clear evidence that by using a PGM zoned close-coupled TWC at similar PGM costs CO tailpipe emissions can be reduced significantly to lead to approximately 12% reduction in CO emissions compared to the other systems.

The compelling advantage of the catalyzed GPFs, Examples 2 and 3, is the observed improvement in NOx emissions. The differences are apparent during the EUDC part of the European Driving Cycle. While NOx breakthroughs could be observed during acceleration in the high speed phase for Reference and Example 1, the catalyzed GPFs are able to attenuate this effect considerably. FIG. 5 shows that by using a catalyzed GPF in the system the overall NOx tailpipe emissions are 10 mg/km lower than for the Reference system.

The invention claimed is:

1. Gasoline engine exhaust treatment system comprising a close-coupled three-way catalyst (TWC) and a downstream catalyzed gasoline wallflow particulate filter (GPF),
wherein an amount of platinum group metals in the TWC exceeds an amount of platinum group metals in the GPF by a factor of at least 5, and
wherein the platinum group metal loading of the TWC is from 25-120 g/ft$^3$ and the platinum group metal loading of the GPF is from 2-20 g/ft$^3$.

2. Treatment system according to claim 1, wherein the TWC and GPF each comprise the platinum group metals Pd and Rh.

3. Treatment system according to claim 1, wherein the upstream TWC is located about 5-20 cm downstream of the engine outlet, manifold outlet or turbo charger.

4. Treatment system according to claim 1, wherein the downstream GPF is located about 60-120 cm downstream of the engine.

5. Treatment system according to claim 1, wherein a weight ratio of Pd to Rh in the TWC is 8-40:1.

6. Treatment system according to claim 1, wherein a weight ratio of Pd to Rh in the GPF is 1-10:1.

7. Treatment system according to claim 1, wherein the upstream TWC has a Pd-zoning.

8. Treatment system according to claim 1, wherein the downstream GPF has a porous structure with a mean pore size of 14-25 μm.

9. Treatment system according to claim 8, wherein a particle size of particles supporting the platinum group metals received by the GPF is less than the mean pore size of the GPF involved.

10. Treatment system according to claim 1, wherein the downstream GPF has a porous structure with a porosity between 45%-75%.

11. Process for the abatement of noxious pollutants contained in an exhaust gas emitted by a gasoline engine, comprising contacting the exhaust gas with the system of claim 1.

12. Treatment system according to claim 1, wherein the amount of platinum group metals in the TWC exceeds the amount of platinum group metals in the GPF by a factor of 10-23.

13. Treatment system according to claim 1, wherein the amount of platinum group metals in the TWC exceeds the amount of platinum group metals in the GPF by a factor of 15-20.

14. Treatment system according to claim 1, wherein the amount of platinum group metals in the TWC exceeds the amount of platinum group metals in the GPF by a factor of 16-19.

15. Treatment system according to claim 1, wherein the platinum group metal loading of the TWC is from 30-80 g/ft$^3$.

16. Treatment system according to claim 1, wherein the GPF has a platinum group metal loading that is arranged entirely or at least predominately within the porous walls of the GPF.

17. Treatment system according to claim 1, wherein the platinum group metal loading of the GPF is from 2-15 g/ft$^3$.

18. Treatment system according to claim 1, wherein the platinum group metal loading of the GPF is from 2-10 g/ft$^3$.

19. Treatment system according to claim 1, wherein the GPF has a mean pore size of 18-22 μm and a porosity of 60-70%.

* * * * *